(12) United States Patent
Sumida et al.

(10) Patent No.: US 9,021,851 B2
(45) Date of Patent: May 5, 2015

(54) METHOD OF MANUFACTURING PULLEY COVER IN CONTINUOUSLY VARIABLE TRANSMISSION

(75) Inventors: Souichirou Sumida, Wako (JP); Shuji Ichijo, Wako (JP); Toru Yagasaki, Wako (JP); Yukio Yuzawa, Saitama (JP); Kazuhiko Isoe, Saitama (JP)

(73) Assignees: Honda Motor Co., Ltd., Tokyo (JP); G-Tekt Corporation, Saitama-shi (JP)

( * ) Notice: Subject to any disclaimer, the term of this patent is extended or adjusted under 35 U.S.C. 154(b) by 349 days.

(21) Appl. No.: 13/478,567

(22) Filed: May 23, 2012

(65) Prior Publication Data
US 2012/0304726 A1    Dec. 6, 2012

(30) Foreign Application Priority Data

May 30, 2011    (JP) .................................. 2011-119901

(51) Int. Cl.
*F16H 55/56*    (2006.01)
*F16H 63/06*    (2006.01)
*B21D 53/26*    (2006.01)

(52) U.S. Cl.
CPC .............. *F16H 55/56* (2013.01); *B21D 53/261* (2013.01); *F16H 63/065* (2013.01)

(58) Field of Classification Search
CPC ........ F16H 55/52; F16H 55/56; B21D 53/261
USPC ....................................... 72/325, 363, 379.2
See application file for complete search history.

(56) References Cited

U.S. PATENT DOCUMENTS

| | | | | |
|---|---|---|---|---|
| 4,897,909 | A * | 2/1990 | LaVoy | 72/327 |
| 6,029,334 | A * | 2/2000 | Hartley | 29/521 |
| 7,310,919 | B2 * | 12/2007 | Grossman et al. | 52/302.2 |
| 2004/0182558 | A1 * | 9/2004 | Watanabe et al. | 72/379.2 |

FOREIGN PATENT DOCUMENTS

| | | |
|---|---|---|
| CN | 1863615 A | 11/2006 |
| JP | 8-290219 A | 11/1996 |
| JP | 2005-090719 A | 4/2005 |
| JP | 2005-249132 A | 9/2005 |
| JP | 2008-075792 A | 4/2008 |
| JP | 2009-264427 A | 11/2009 |

OTHER PUBLICATIONS

Chinese Office Action dated Jul. 25, 2014, issued in corresponding Chinese Patent Application No. 201210169418.6 (6 pages).

* cited by examiner

*Primary Examiner* — Teresa M Ekiert
(74) *Attorney, Agent, or Firm* — Westerman, Hattori, Daniels & Adrian, LLP

(57) ABSTRACT

An oil hole penetrating through a partition wall of a pulley cover of a continuously variable transmission is formed in a direction perpendicular to an axis of the pulley cover. The pulley cover, having first and second hydraulic oil chambers through which a movable pulley half of a pulley of the continuously variable transmission is biased toward a fixed pulley half thereof, is manufactured in the step of machining a metal sheet. The manufacturing step includes a first step of press-forming the annular partition wall of the pulley cover, a second step of opening the oil hole in the partition wall, the oil hole allowing communication between the first and second hydraulic oil chambers, and a third step of press-forming the peripheral wall of the second hydraulic oil chamber at an outer side, in a radial direction, of the partition wall.

3 Claims, 4 Drawing Sheets

Method of Manufacturing Pulley Cover in Continuously Variable Transmission

CROSS-REFERENCE TO RELATED APPLICATION

This application claims priority from Japanese Patent Application No. 2011-119901, filed May 30, 2011, the entire contents of which are incorporated herein by reference.

TECHNICAL FIELD

The present disclosure relates to a continuously variable transmission in which an endless transmission member is wound around a drive pulley and a driven pulley and which shifts a gear ratio by changing a groove width of the drive pulley and a groove width of the driven pulley by means of hydraulic pressure, and especially relates to a method of manufacturing its pulley cover.

BACKGROUND OF THE INVENTION

There has been a belt-type continuously variable transmission which shifts the gear ratio by changing, by mean of hydraulic pressure, the groove widths of a drive pulley and a driven pulley having a metal belt wound therearound, and in which three hydraulic oil chambers are formed between a movable pulley half and a pulley cover, and three pistons respectively facing these three hydraulic oil chambers are driven by means of hydraulic pressure to bias the movable pulley half toward its fixed pulley half. This continuously variable transmission has been publicly known by Japanese Patent Application Laid-open No. 2009-264427.

FIG. 4 shows a pulley cover 01, a forged product, described in Japanese Patent Application Laid-open No. 2009-264427. The forged pulley cover 01 includes a disk-shaped side wall 02, an annular partition wall 03, and an annular peripheral wall 04. A first hydraulic oil chamber 05 is formed at an inner side, in a radial direction, of the partition wall 03, while a second hydraulic oil chamber 06 is formed at an outer side, in the radial direction, of the partition wall 03. An oil hole 07 allowing communication between the first and second hydraulic oil chambers 05, 06 is machined to penetrate through the partition wall 03. When the oil hole 07 is machined in the forged pulley cover 01, the oil hole 07 needs to be formed inclining at an angle θ to the radial direction which is centered on an axis L. This is because machining from the radially inner side of the partition wall 03 causes interference between a portion of the partition wall 03 on the opposite side of the axis L and a tool such as a drill, whereas machining from the radially outer side of the partition wall 03 causes interference between the peripheral wall 04 and a tool such as a drill.

When the oil hole 07, which has a given diameter D, is inclined at the angle θ to the radial direction, a dimension D' of the oil hole 07 in the direction of the axis L becomes larger than the diameter D, causing a problem that the dimension of the pulley cover 01 in the direction of an axis L is increased accordingly.

SUMMARY OF THE INVENTION

The present disclosure has been made in view of the foregoing circumstance, and an object thereof is such that an oil hole penetrating through a partition wall of a pulley cover of a continuously variable transmission can be formed in a direction perpendicular to an axis of the pulley cover.

In order to achieve the object, according to a first feature of the present disclosure, there is provided a method of manufacturing a pulley cover in a continuously variable transmission in which an endless transmission member is wound around a drive pulley and a driven pulley and which shifts a gear ratio by changing a groove width of the drive pulley and a groove width of the driven pulley by means of hydraulic pressure, at least one of the drive pulley and the driven pulley including a fixed pulley half fixed on a rotary shaft, a movable pulley half supported on the rotary shaft in such a way as to be incapable of rotation relative thereto but capable of movement in an axial direction, a pulley cover fixed to the rotary shaft and facing a rear surface of the movable pulley half, and first and second hydraulic oil chambers defined inside the pulley cover and separated in an inner side and an outer side in a radial direction by an annular partition wall, the movable pulley half being configured to be biased toward the fixed pulley half by hydraulic pressure supplied to the first and second hydraulic oil chambers, the method comprising a step of manufacturing the pulley cover by machining a metal sheet, the manufacturing step including: a first step of press-forming the annular partition wall; a second step of opening an oil hole in the partition wall, the oil hole allowing communication between the first and second hydraulic oil chambers; and a third step of press-forming a peripheral wall of the second hydraulic oil chamber at an outer side, in the radial direction, of the partition wall.

According to the configuration of the first feature, the pulley cover, having the first and second hydraulic oil chambers through which the movable pulley half of the pulley of the continuously variable transmission is biased toward the fixed pulley half thereof, is manufactured in the step of machining a metal sheet, and this manufacturing step includes: the first step of press-forming the annular partition wall of the pulley cover; the second step of opening the oil hole in the partition wall, the oil hole allowing communication between the first and second hydraulic oil chambers; and the third step of press-forming the peripheral wall of the second hydraulic oil chamber at the outer side, in the radial direction, of the partition wall. Thus, when the oil hole is opened in the partition wall in the second step, the peripheral wall of the second hydraulic oil chamber is not yet press-formed, thereby avoiding interference of a tool for opening the oil hole in the partition wall with the peripheral wall. This makes it possible to form the oil hole in the partition wall in a direction perpendicular to the axis of the pulley cover. Accordingly, as compared to a case of opening the oil hole obliquely, the dimension of the oil hole in the direction of the axis can be minimized, thereby reducing the dimension of the pulley cover in the direction of the axis. In addition, since the peripheral wall is press-formed after the opening of the oil hole, the second hydraulic oil chamber can be formed with no difficulty.

According to a second feature of the present disclosure, in addition to the configuration of the first feature, there is provided the method of manufacturing a pulley cover in the continuously variable transmission, wherein the oil hole is opened by piercing.

According to the configuration of the second feature, the oil hole is opened by piercing. Thus, when the punch penetrates through the partition wall which is formed by folding a part of the metal sheet into two layers by pressing, a burr created in a portion of the metal sheet which the punch penetrates first bites into a portion of the metal sheet which the punch penetrates next, and thereby exhibits a sealing effect.

Accordingly, hydraulic oil can be prevented from leaking from the oil hole in the partition wall where the metal sheet is two-layered, with no special sealing member or no special sealing work needed.

According to a third feature of the present disclosure, in addition to the configuration of the second feature, there is provided the method of manufacturing a pulley cover in the continuously variable transmission, wherein the piercing is performed by moving a punch toward a die from an inner side, in the radial direction, of the partition wall with the die being set at the outer side, in the radial direction, of the partition wall.

Furthermore, according to the configuration of the third feature, the piercing is performed by moving the punch toward the die from an inner side, in the radial direction, of the partition wall with the die being set at the outer side, in the radial direction, of the partition wall where the peripheral wall is not yet formed. Thus, the die can be set without interfering with the peripheral wall. Accordingly, the workability is improved.

Here, a metal belt 19 of an embodiment corresponds to the endless transmission member of the present disclosure; and an outer shaft 40 of the embodiment corresponds to the rotary shaft of the present disclosure.

The above and other objects, characteristics and advantages of the present disclosure will be clear from detailed descriptions of the various embodiments which will be provided below while referring to the attached drawings.

BRIEF DESCRIPTION OF THE DRAWINGS

The advantages of the invention will become apparent in the following description taken in conjunction with the drawings, wherein.

DETAILED DESCRIPTION OF THE INVENTION

An embodiment of the present disclosure will be described below based on FIGS. 1 to 3.

Figure 1:
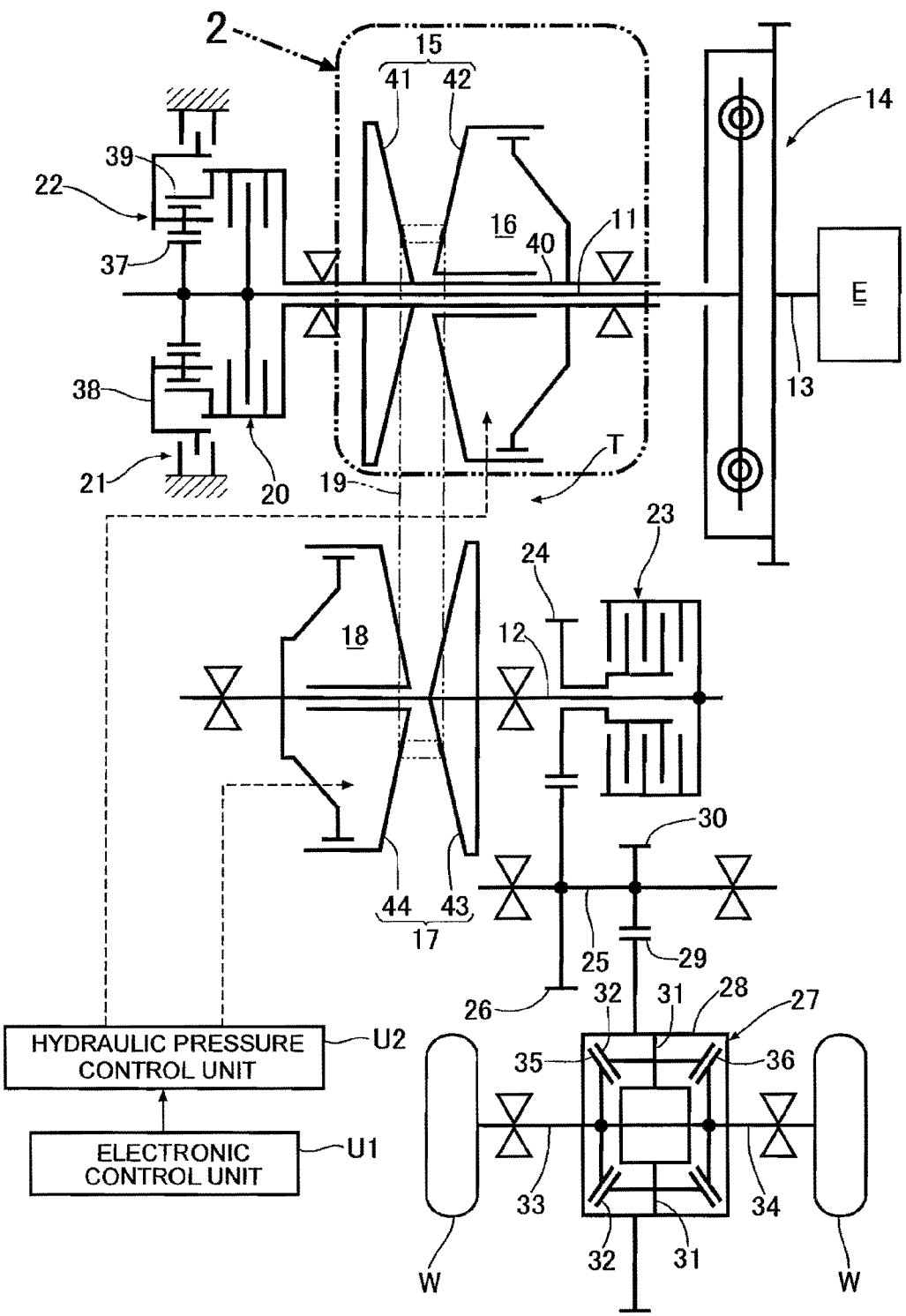
FIG. 1 is a schematic view of a power transmission system of a vehicle including a metal belt type continuously variable transmission.

As shown in FIG. 1, a continuously variable transmission T for a vehicle includes a drive shaft 11 and a driven shaft 12 arranged in parallel with each other. A left end of a crankshaft 13 of an engine E is connected to a right end of the drive shaft 11 through a damper 14.

A tubular outer shaft 40 is fitted on an outer periphery of the drive shaft 11 in such a way as to be capable of rotation relative thereto. A drive pulley 15 is supported on the outer shaft 40 and includes a fixed pulley half 41 formed integrally with the outer shaft 40, and a movable pulley half 42 axially slidable relative to the fixed pulley half 41. The movable pulley half 42 can change the groove width between itself and the fixed pulley half 41 by means of hydraulic pressure which is applied to a hydraulic oil chamber 16. A driven pulley 17 is supported on the driven shaft 12 and includes a fixed pulley half 43 formed integrally with the driven shaft 12, and a movable pulley half 44 axially slidable relative to the fixed pulley half 43. The movable pulley half 44 can change the groove width between itself and the fixed pulley half 43 by means of hydraulic pressure which is applied to a hydraulic oil chamber 18. In addition, a metal belt 19 is wound around the drive pulley 15 and the driven pulley 17.

At a left end of the drive shaft 11, provided is a forward-reverse shifting mechanism 22 formed of a single-pinion planetary gear mechanism and including a forward clutch 20 and a reverse brake 21. When a forward gear stage is to be established, the forward clutch 20 is engaged to transmit the rotation of the drive shaft 11 in the same direction to the outer shaft 40. When a reverse gear stage is to be established, the reverse brake 21 is engaged to transmit the rotation of the drive shaft 11 in the opposite direction to the outer shaft 40. In the forward-reverse shifting mechanism 22, a sun gear 37 is fixed to the drive shaft 11; a planetary carrier 38 can be constrained on a casing by the reverse brake 21; a ring gear 39 can be coupled to the outer shaft 40 by the forward clutch 20.

A start-up clutch 23 is provided at a right end of the driven shaft 12 and couples a first intermediate gear 24 to the driven shaft 12. The first intermediate gear 24 is supported on the driven shaft 12 in such a way as to be capable of rotation relative thereto. An intermediate shaft 25 is arranged in parallel with the driven shaft 12 and is provided with a second intermediate gear 26 which meshes with the first intermediate gear 24. An input gear 29 is provided to a gearbox 28 of a differential gear 27 and meshes with a third intermediate gear 30 provided to the intermediate shaft 25. A pair of pinions 32, 32 are supported on the gearbox 28 through pinion shafts 31, 31 and mesh with side gears 35, 36 provided at tip ends of left and right axles 33, 34, respectively. The left and right axles 33, 34 are supported on the gearbox 28 in such a way as to be capable of rotation relative thereto. Drive wheels W, W are connected to the other ends of the left and right axles 33, 34, respectively.

Thus, when a forward range is selected through a selection lever, firstly, the forward clutch 20 is engaged by a hydraulic pressure control unit U2, which is actuated upon a command from an electronic control unit U1, so that the drive shaft 11 is coupled integrally to the drive pulley 15 through the outer shaft 40. Thereafter, the start-up clutch 23 is engaged, so that the torque of the engine E is transmitted to the drive wheels W through the drive shaft 11, the outer shaft 40, the drive pulley 15, the metal belt 19, the driven pulley 17, the driven shaft 12, and the differential gear 27. As a result, the vehicle starts moving forward. When a reverse range is selected through the selection lever, the reverse brake 21 is engaged by the hydraulic pressure control unit U2, so that the outer shaft 40 and the drive pulley 15 are driven in the direction opposite to the rotational direction of the drive shaft 11. Thus, as the start-up clutch 23 is engaged, the vehicle starts moving backward.

As the vehicle starts moving as described above, the hydraulic pressure control unit U2 increases the hydraulic pressure supplied to the hydraulic oil chamber 16 in the drive pulley 15 to move the movable pulley half 42 of the drive pulley 15 closer to its fixed pulley half 41, thereby increasing the effective radius, while the hydraulic pressure control unit U2 decreases the hydraulic pressure supplied to the hydraulic oil chamber 18 in the driven pulley 17 to move the movable pulley half 44 of the driven pulley 17 away from its fixed pulley half 43, thereby decreasing the effective radius. As a result, the ratio of the continuously variable transmission T varies continuously from LOW side toward OD side.

The drive pulley 15 and the driven pulley 17 have substantially the same structure. Thus, the structure of the drive pulley 15 will be described representatively.

Figure 2:
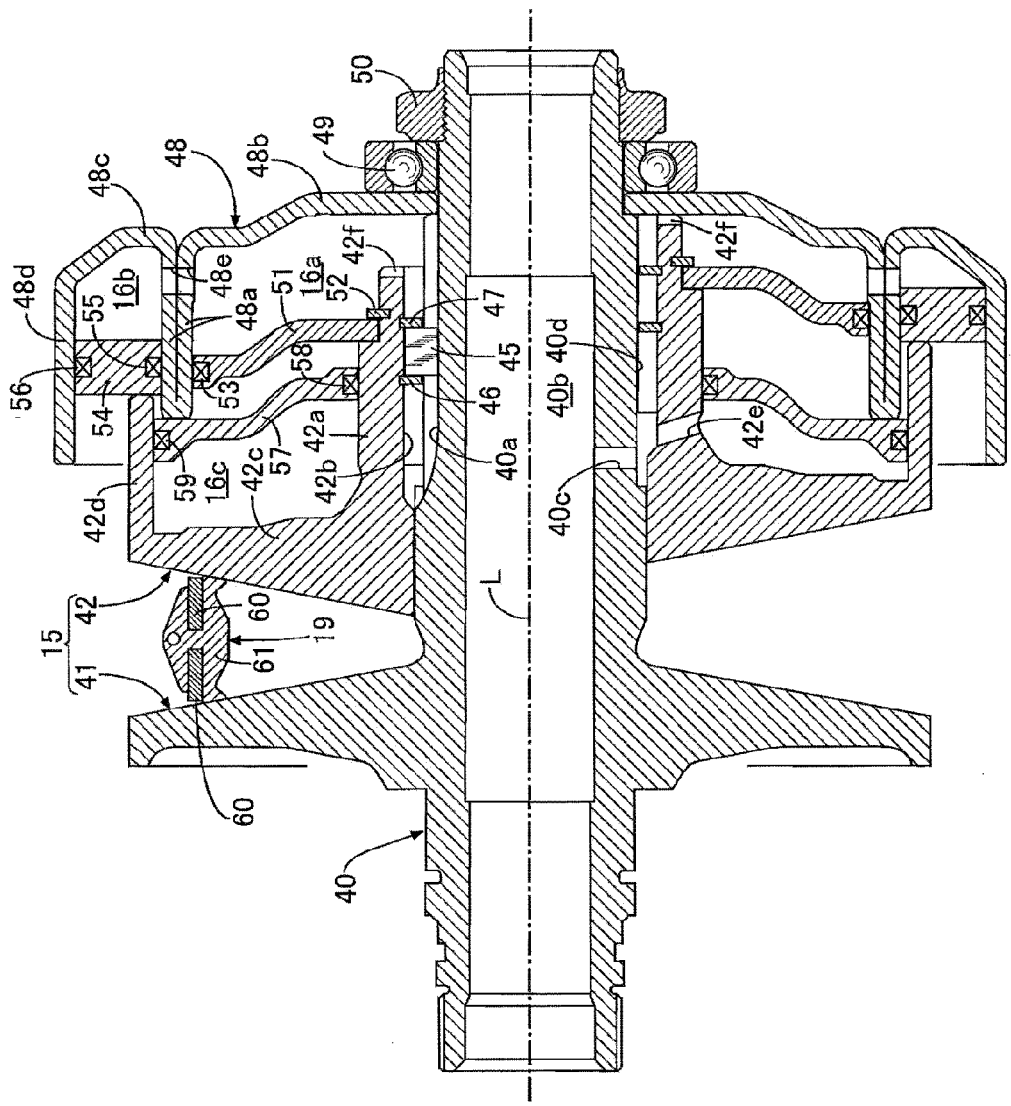
FIG. 2 is an enlarged cross-sectional view of a part indicated by an arrow 2 in FIG. 1.

As shown in FIG. 2, the drive pulley 15 includes the fixed pulley half 41 and the movable pulley half 42. The fixed pulley half 41 is formed integrally with the outer shaft 40, while the movable pulley half 42 is supported on the outer shaft 40 in such a way as to be capable of sliding in the direction of an axis L but incapable of rotation relative to the outer shaft 40.

Specifically, a spline groove 40a is formed in the direction of the axis L in an outer peripheral surface of the outer shaft 40; a spline groove 42b is formed in the direction of the axis L in an inner peripheral surface of a boss portion 42a of the movable pulley half 42; in these spline grooves 40a, 42b, a key 45 is fitted and is locked by a pair of clips 46, 47; and by causing this key 45 to slide along the spline groove 40a in the outer shaft 40, the movable pulley half 42 can move toward and away from the fixed pulley half 41 while rotating together with the outer shaft 40.

A center portion of a pulley cover 48 obtained by press-forming a metal sheet is fitted on an outer periphery of the outer shaft 40 and fastened by a nut 50 with a ball bearing 49 sandwiched therebetween. The ball bearing 49 is used for supporting the outer shaft 40 on the casing. The pulley cover 48 is a cup-shaped member with its opening side facing the movable pulley half 42. Inside the pulley cover 48, an annular partition wall 48a centered on the axis L is projected, and an annular first hydraulic oil chamber 16a and an annular second hydraulic oil chamber 16b are formed. The first hydraulic oil chamber 16a is formed by the partition wall 48a, an inner side wall 48b extending in the radial direction, and the outer peripheral surface of the outer shaft 40. The second hydraulic oil chamber 16b is formed by the partition wall 48a, an outer side wall 48c extending in the radial direction, and a peripheral wall 48d extending in the direction of the axis L. Moreover, a peripheral wall 42d extends in the direction of the axis L from an outer peripheral portion of a side wall 42c of the movable pulley half 42, and an annular third hydraulic oil chamber 16c is formed by the peripheral wall 42d, the side wall 42c, and the boss portion 42a.

An inner peripheral portion of an annular first piston 51 facing the first hydraulic oil chamber 16a is locked on the boss portion 42a of the movable pulley half 42 by a clip 52, while an outer peripheral portion of the first piston 51 is slidably fitted on the partition wall 48a of the pulley cover 48 with a sealing member 53 therebetween. An annular second piston 54 facing the second hydraulic oil chamber 16b is slidably fitted on the partition wall 48a and the peripheral wall 48d of the pulley cover 48 with a pair of sealing members 55, 56 therebetween, respectively. An annular third piston 57 facing the third hydraulic oil chamber 16c is slidably fitted on the boss portion 42a and the peripheral wall 42d of the movable pulley half 42 with a pair of sealing members 58, 59 therebetween, respectively.

An oil hole 40c extends in the radial direction from an oil passage 40b formed in the direction of the axis L inside the outer shaft 40 and communicates with an oil groove 40d formed in the direction of the axis L in the outer peripheral surface of the outer shaft 40. The oil groove 40d communicates with the third hydraulic oil chamber 16c through an oil hole 42e formed in the boss portion 42a of the movable pulley half 42. The oil groove 40d communicates also with the first hydraulic oil chamber 16a through a cutout 42f formed at a tip end of the boss portion 42a of the movable pulley half 42. The first hydraulic oil chamber 16a communicates with the second hydraulic oil chamber 16b through an oil hole 48e formed in the partition wall 48a of the pulley cover 48.

The metal belt 19 is formed in an endless shape with a pair of metal ring assemblies 60, 60 and a number of metal elements 61 supported thereon, each metal ring assembly 60 being formed by stacking a number of metal rings. The metal belt 19 is wound around the fixed pulley half 41 and the movable pulley half 42 of the drive pulley 15.

Thus, hydraulic oil supplied from the oil passage 40b in the outer shaft 40 is supplied through the oil hole 40c in the outer shaft 40, the oil groove 40d in the outer shaft 40, and then the cutout 42f in the boss portion 42a of the movable pulley half 42 to the first hydraulic oil chamber 16a, and thereafter supplied therefrom through the oil hole 48e in the partition wall 48a of the pulley cover 48 to the second hydraulic oil chamber 16b. As a result, the first piston 51 facing the first hydraulic oil chamber 16a is moved to push the boss portion 42a of the movable pulley half 42, and also the second piston 54 facing the second hydraulic oil chamber 16b is moved to push the peripheral wall 42d of the movable pulley half 42. At the same time, the hydraulic oil supplied from the oil passage 40b in the outer shaft 40 is also supplied through the oil hole 40c in the outer shaft 40 and the oil hole 42e in the boss portion 42a of the movable pulley half 42 to the third hydraulic oil chamber 16c, and pushes the side wall 42c of the movable pulley half 42 away from the third piston 57 which is constrained on the partition wall 48a of the pulley cover 48. As a result, the movable pulley half 42 approaches the fixed pulley half 41. This reduces the groove width of the drive pulley 15 and thereby moves the metal belt 19 radially outward.

Next, a method of manufacturing the pulley cover 48 will be described.

Figure 3A:
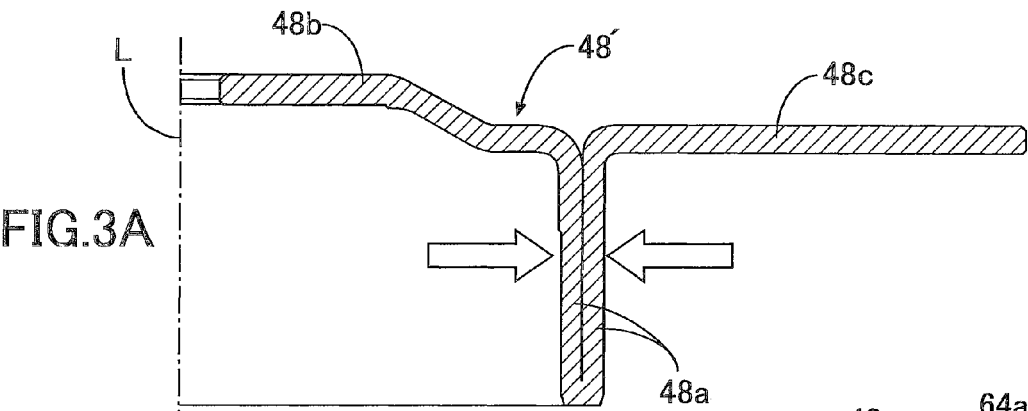
FIGS. 3A to 3C are cross-sectional views explaining a manufacturing step of a pulley cover.
Figure 3B:
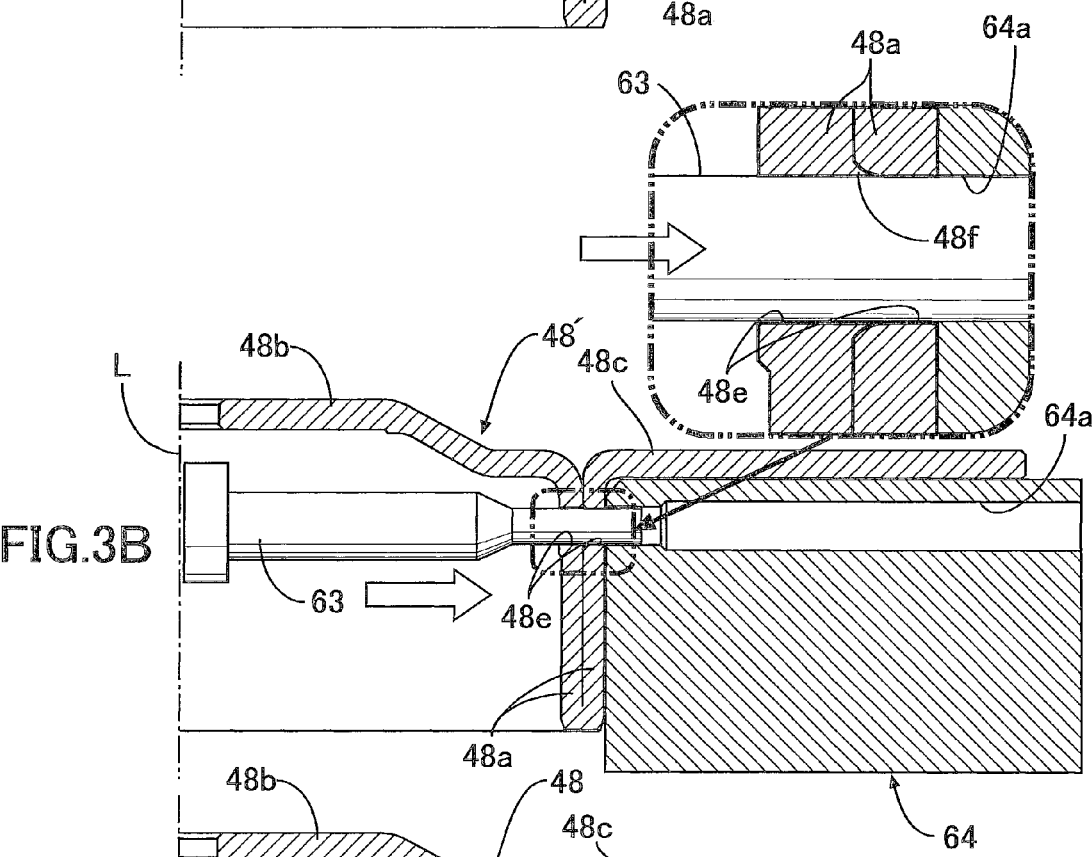

First, in a first step shown in FIG. 3A, a flat metal sheet 48' is pressed such that a portion of the metal sheet 48' is folded into two layers to form the annular partition wall 48a. Thereafter, in a second step shown in FIG. 3B, with a die 64 being set at a radially outer side of the partition wall 48a, a punch 63 is moved radially outward from the axis L side to punch the partition wall 48a to a hole portion 64a in the die 64, so that the shear force opens the oil hole 48e through the partition wall 48a. In this step, the peripheral wall 48d (see FIG. 3C) of the pulley cover 48 is not yet formed, and therefore the die 64 does not interfere with the peripheral wall 48d. Accordingly, the oil hole 48e can be formed in a direction perpendicular to the axis L.

In the second step, when the punch 63 penetrates through the two-layered partition wall 48a of the metal sheet 48', a burr 48f is created inside the oil hole 48e. This burr 48f bites into the two-layered portion of the metal sheet 48' from one to the other side and thereby exhibits a sealing effect. Accordingly, the hydraulic oil can be prevented from leaking from the oil hole 48e in the partition wall 48a with no special sealing member or no special sealing work needed.

Figure 3C:
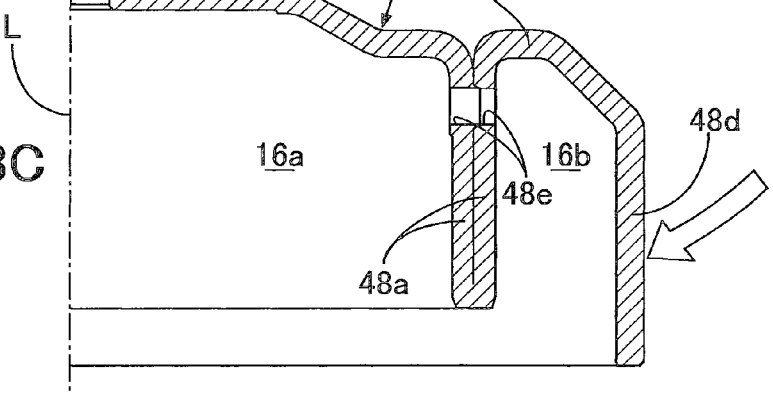

Thereafter, in a third step shown in FIG. 3C, an outer peripheral portion of the metal sheet 48' is bent by pressing to form the annular peripheral wall 48d, whereby the pulley cover 48 is completed.

Figure 4:
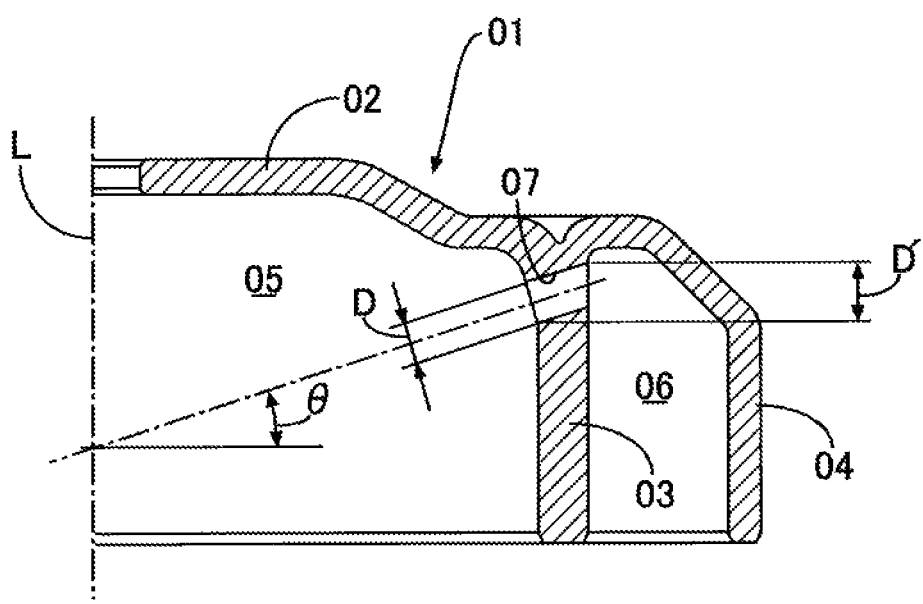
FIG. 4 is a sectional view of a conventional pulley cover.

As described above, since the oil hole 48e is machined in the partition wall 48a prior to the machining of the peripheral wall 48d of the pulley cover 48, the punch 63 and the die 64 can avoid their interference with the peripheral wall 48d. Hence, the oil hole 48e can be formed in the direction perpendicular to the axis L. Accordingly, as compared to the conventional example shown in FIG. 4, the dimension in the direction of the axis L dominated by the oil hole 48e can be reduced, thereby reducing the dimension of the pulley cover 48 in the direction of the axis L. In addition, since the pulley cover 48 can be manufactured by pressing, large cost reduction is possible as compared to the case of manufacturing it by forging.

Although an embodiment of the present disclosure has been described above, various design changes can be made to the present disclosure without departing from the gist thereof.

For example, the endless transmission member of the present disclosure is not limited to the metal belt 19 of the embodiment and may be a belt made of a flexible material such as rubber or may be an endless chain.

Moreover, although the hydraulic oil chamber 16 of the embodiment is formed of the first to third hydraulic chambers 16a to 16c, the hydraulic oil chamber 16 only needs to be formed at least of the first and second hydraulic oil chambers 16a, 16b.

Further, although the oil hole 48e is formed by piercing in the embodiment, the oil hole 48e can be formed by drilling or by laser machining.

Furthermore, although applied to the drive pulley 15 in the embodiment, the present disclosure can be applied to the driven pulley 17.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A method of manufacturing a pulley cover in a continuously variable transmission in which an endless transmission member is wound around a drive pulley and a driven pulley and which shifts a gear ratio by changing a groove width of the drive pulley and a groove width of the driven pulley by means of hydraulic pressure, at least one of the drive pulley and the driven pulley including a fixed pulley half fixed on a rotary shaft, a movable pulley half supported on the rotary shaft in such a way as to be incapable of rotation relative thereto but capable of movement in an axial direction, a pulley cover fixed to the rotary shaft and facing a rear surface of the movable pulley half, and first and second hydraulic oil chambers defined inside the pulley cover and separated in an inner side and an outer side in a radial direction by an annular partition wall, the movable pulley half being configured to be biased toward the fixed pulley half by hydraulic pressure supplied to the first and second hydraulic oil chambers, the method comprising:
manufacturing the pulley cover by machining a metal sheet, the machining of the metal sheet comprising:
press-forming the annular partition wall;
opening an oil hole in the partition wall, the oil hole allowing communication between the first and second hydraulic oil chambers; and
then press-forming a peripheral wall of the second hydraulic oil chamber at an outer side, in the radial direction, of the partition wall so as to make the peripheral wall of the second hydraulic oil chamber extend substantially parallel to and be opposed to said annular partition wall.

2. The method of manufacturing a pulley cover in the continuously variable transmission according to claim 1, wherein the oil hole is opened by piercing.

3. The method of manufacturing a pulley cover in the continuously variable transmission according to claim 2, wherein the piercing is performed by moving a punch toward a die from an inner side, in the radial direction, of the partition wall with the die being set at the outer side, in the radial direction, of the partition wall.

* * * * *